United States Patent [19]
Käuferle et al.

[11] 3,942,100
[45] Mar. 2, 1976

[54] ADJUSTABLE REACTIVE POWER COMPENSATOR FOR A TRANSMISSION LINE

[75] Inventors: Josef Käuferle, Oberrohrdorf; Konrad Reichert, Wettingen, both of Switzerland

[73] Assignee: BBC Brown Boveri & Company Limited, Baden, Switzerland

[22] Filed: Mar. 12, 1974

[21] Appl. No.: 450,296

[30] Foreign Application Priority Data
Mar. 14, 1973 Switzerland................ 3691/73

[52] U.S. Cl.............. 323/106; 323/8; 323/109; 323/119; 323/124; 323/127
[51] Int. Cl.² ........................... H02J 3/18
[58] Field of Search ......... 321/9 R, 10; 323/1, 8, 323/56, 76, 81, 101, 102, 106, 109, 119, 120, 124, 127, 128

[56] References Cited
UNITED STATES PATENTS

| | | | |
|---|---|---|---|
| 2,358,394 | 9/1944 | Haug.................... | 323/76 X |
| 2,858,406 | 10/1958 | Boyd et al............. | 323/76 X |
| 3,061,770 | 10/1962 | Steinitz................ | 323/81 |
| 3,400,326 | 9/1968 | Zhukov et al........... | 323/101 |
| 3,740,638 | 6/1973 | Thorborg................ | 323/127 X |
| 3,829,736 | 8/1974 | Schirman................ | 323/8 |

FOREIGN PATENTS OR APPLICATIONS
854,544 8/1953 Germany ............... 323/76

*Primary Examiner*—A. D. Pellinen
*Attorney, Agent, or Firm*—Toren, McGeady and Stanger

[57] ABSTRACT

An improved reactive power compensator for a transmission line is effective to correct voltage transients and overloads of diverse kinds. The reactive power developed by a conventional main reactive element such as a DC-bias controlled choke in the compensator is varied in accordance with an error signal representative of the difference between the instantaneous voltage across a particular junction of the line and a reference value. Excitation for the main element is supplied by a variable shunt reactance which exhibits a no-load inductive power loss that is large compared to the magnetization power loss of a conventional distribution transformer. The shunt reactance has an exciting winding coupled across the line at the junction and a power winding inductively coupled to the exciting winding for feeding the main reactive element.

11 Claims, 6 Drawing Figures

ADJUSTABLE REACTIVE POWER COMPENSATOR FOR A TRANSMISSION LINE

BACKGROUND OF THE INVENTION

As is well known, long power transmission lines are susceptible to instabilities in line frequency and voltage and also to transient overvoltages due to abrupt changes in operating conditions such as load drop-off.

Reactive power compensators are commonly used in such transmission lines to minimize transmission losses and to maintain the line voltage levels within prescribed limits. A common scheme of this type includes a shunt reactor located at a specified junction along the line as described, e.g., in A. Edlinger et al, "Use of High Voltage Chokes for Compensation of Very High Voltage Transmission Lines", CIGRE Report Number 402 (1964).

In order to provide stabilization in such types of systems, a capacitor may be serially connected in the line as described in the above-mentioned report. Alternatively, stabilization can be provided by means of a choke having DC-controlled bias magnetization and connectable directly to the line in the manner described, e.g., in H. Becker et al, "Three-Phase Shunt Reactors with Continuously Controlled Reactive Current," CIGRE Report Number 31 - 13 (1972). Another type of stabilizer employs a nonlinear choke having compensation windings and associated filter circuitry, such choke being connected to the line via a conventional distributional transformer in the manner described, e.g., in E. Friedlander, "Static Network Stabilization," GEC Journal, pages 58 – 64 (1966).

Presently known compensators of these types have several disadvantages. The arrangements connectable directly to the line are unable to fully limit over-voltages during start-up conditions. The use of a conventional distribution transformer coupled between the line and the remainder of the compensator results in the excitation of harmonic and subharmonic oscillations because of the reactance of the transformer. Even the DC magnetization scheme, which avoids these immediate problems, is limited in its effectiveness because of the time constant of the DC circuit.

SUMMARY OF THE INVENTION

The arrangement of the invention provides an improved reactive power compensator which avoids the above-mentioned disadvantages; further, it results in the effective limitation of over-voltages during various situations such as start-up, fault occurrence and load switching, as well as in the improved stability of the system.

In an illustrative embodiment, the compensator includes a main reactive element such as a choke which is controlled by DC bias magnetization and whose reactive power is varied in response to an error signal generated by a control circuit. The error signal is proportional to the difference between the instantaneous voltage at a particular junction of the line and a reference value.

A variable shunt reactance which has an exciting winding connected across the line at the junction has an additional power winding inductively coupled to the exciting winding for supplying excitation current to the main reactive element. The shunt reactance is designed to have a no-load inductive power loss that is large compared to the normal magnetization power loss of a standard distribution transformer. For added stabilization, a discretely adjustable capacitor regulated by the control circuit may be connected in parallel with exciting winding of the shunt reactance.

BRIEF DESCRIPTION OF THE DRAWING

The invention is further set forth in the following detailed description taken in conjunction with the appended drawing, in which.

DETAILED DESCRIPTION

Figure 1:
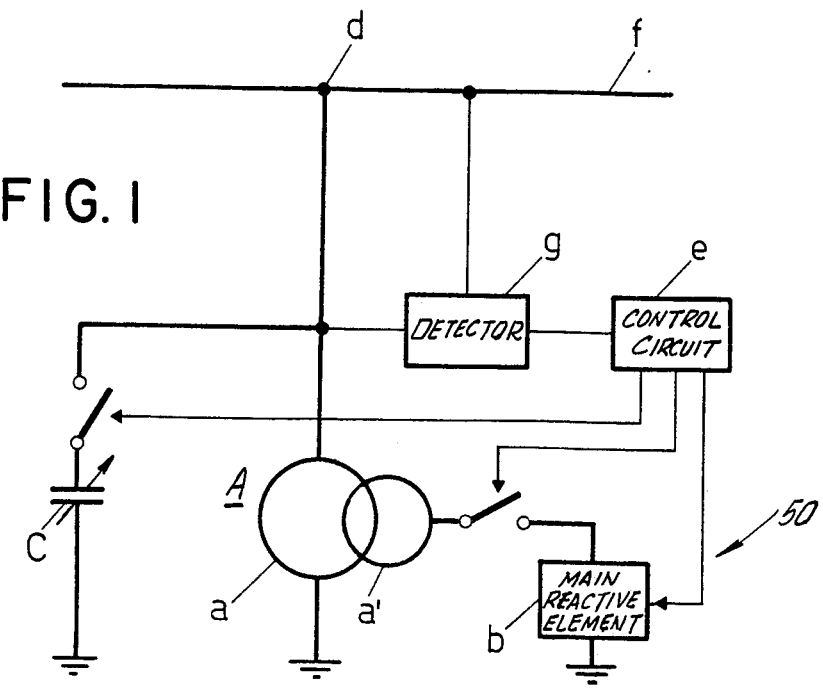
FIG. 1 is a combined block and schematic diagram of an adjustable reactive power compensator in accordance with the invention.

Referring now to the drawing, a transmission line $f$, suitably returned to ground by suitable facilities not shown, is provided with an improved reactive power compensator 50. The compensator 50 is designed to provide improved voltage protection and stabilization of the line under a large variety of operating conditions. For purposes of illustration, the protective effect of the compensator 50 is assumed to be designed in part for voltage stabilization at a particular junction $d$ of the line.

The compensator 50 includes a main reactive element $b$ which may be a conventional choke controlled by DC bias magnetization; however, many other forms of such element are suitable, such as a synchronous phase shifter, a thyristor-controlled capacitor or choke bank, and so forth. It is understood that such elements may be employed singly or in combination as circumstances warrant.

The reactive power of the element $b$ is adjustable in accordance with an error signal from a control circuit $e$ to maintain the voltage at the junction $d$ at a predetermined value and to compensate for excess reactive power swings in the transmission line; such swings may be caused, e.g., by transients or shifting load conditions.

The control circuit $e$ develops the required error signal as a quantity proportional to the difference between the instantaneous voltage at the junction $d$ (as sensed by a suitable detector $g$) and a reference value. In addition to being voltage-responsive in this manner, the control circuit $e$ may also be designed to be effective on a selective basis to vary the reactive power of the element $b$ in accordance with changes in the current amplitude through, or the frequency of excitation of, the line $f$.

Excitation for the element $b$ is not obtained directly from the line $f$ or from a conventional distribution transformer connected to such line as in prior designs; instead, such excitation is provided by a high-voltage variable shunt reactance A having an exciting winding $a$ connected in shunt with the line $f$ at the junction $d$. A power winding $a'$ of the shunt reactance is magnetically coupled to the exciting winding $a$ and serves as the power feed for the element $b$; in this way, the shunt reactance cooperates with the control circuit $e$ to provide the required voltage stabilization of the line.

The inductive power loss of the reactance A when its power winding is unloaded is large compared to the magnetization power loss of a standard distribution transformer. The reactance A performs, in fact, like a transformer with a very large magnetizing current; a magnetization power in the range of 10 - 300 percent of the main power handled by the device is common. The reactance A may also be provided with suitable compensating and control windings (not shown).

Figure 2:
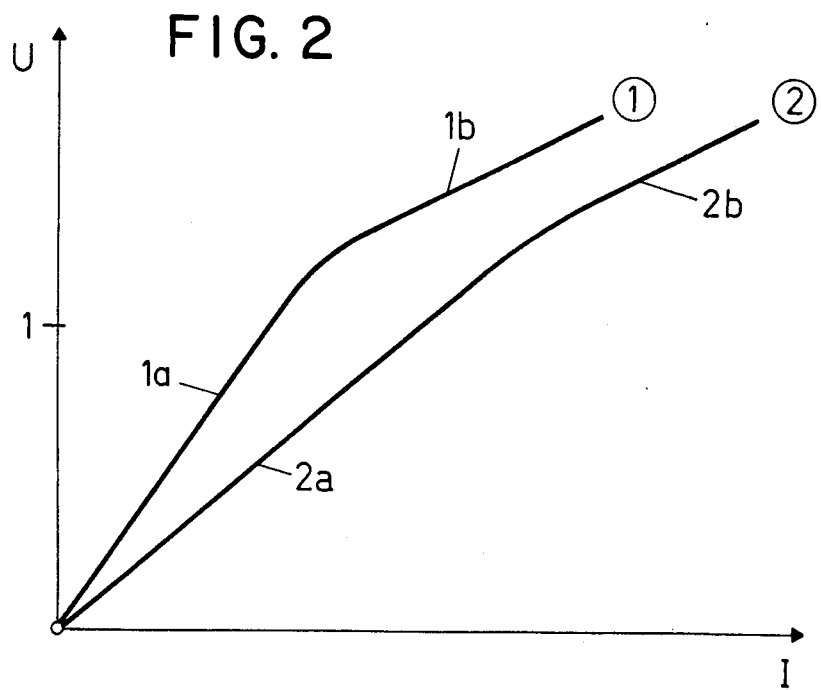
FIG. 2 is a graph illustrating the voltage-current characteristics of a variable shunt reactance in the compensator of FIG. 1 under no-load and loaded conditions, respectively.

The voltage-current characteristics of the exciting winding of the reactance A when the power winding thereof is respectively open-circuited and loaded by the main element $b$ are shown in curves 1 and 2, respectively, of FIG. 2. The no-load, curve 1 exhibits a linear portion $1a$ when the voltage on the line is below a prescribed value and a saturated portion $1b$ when the voltage exceeds such value. Corresponding linear and saturated regions $2a$ and $2b$ are shown for the loaded curve. The saturation current in the portion $1b$ of the curve 1 is much smaller than that of a typical distribution transformer. A transition from linear operation to saturation operation in the shunt reactance is accompanied by an increase in the reactive power handled by the compensator.

For improved stability, a variable capacitor $c$ is coupled in shunt with the exciting winding $a$ of the reactance A. Stepwise control of the value of the capacitor is provided by means of the control circuit $e$.

Figure 3:
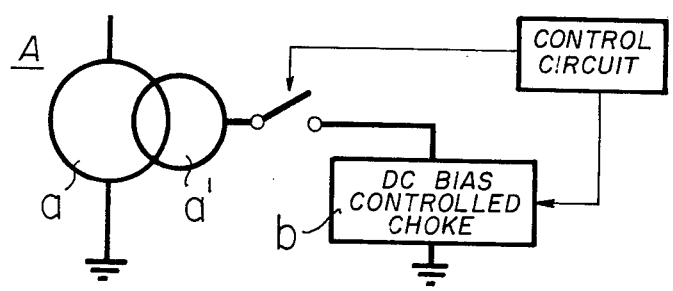
FIGS. 3 to 6 illustrate variations of a portion of the circuit in FIG. 1 and show various forms of the element b, portions which correspond identically to those in FIG. 1 being omitted.
Figure 4:
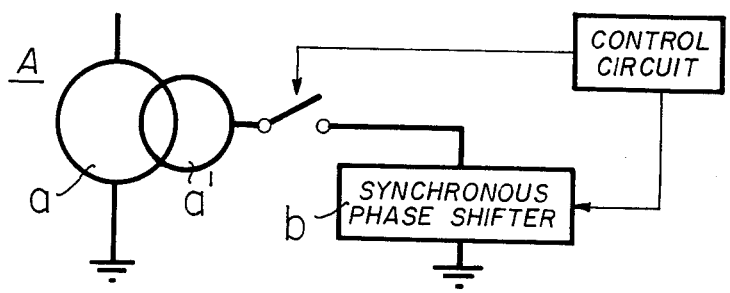
Figure 5:
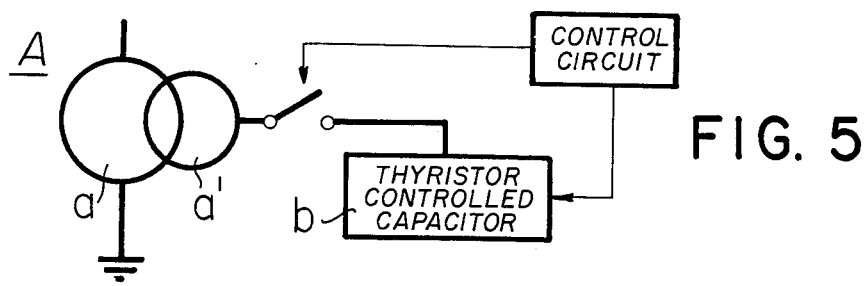
Figure 6:
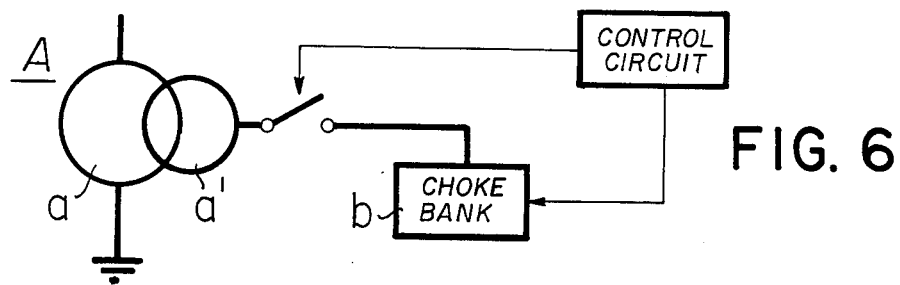

FIG. 3 shows a portion of FIG. 1 wherein the element b takes the form of a DC bias control choke. FIG. 4 shows a portion of FIG. 1 wherein the element b takes the form of a synchronous phase shifter. FIG. 5 shows a portion of FIG. 1 wherein the element b takes the form of a thyristor controlled capacitor. FIG. 6 shows a portion of FIG. 1 wherein the element b takes the form of a choke bank.

In the foregoing, the invention has been described in connection with a preferred arrangement thereof. Many variations and modifications will now occur to those skilled in the art. For example, when the power line is associated with a multiphase distribution system, each phase may be separately controlled by a compensator of the type described above. It is accordingly desired that the scope of the appended claims not be limited to the specific disclosure herein contained.

What is claimed is:

1. A reactive power compensator for a transmission line comprising a reactive power drawing element, control means responsive to variations in the voltage at a prescribed junction of the line for varying the reactive power draw of the element, an adjustable shunt reactance having an exciting winding connected across the line and a secondary winding magnetically coupled to the exciting winding and connected to the element for energizing such element, said element drawing power from the reactance, said control means varying the power drawn from the reactance on the basis of variations in the line voltage so as to vary the reactive effect of the reactance.

2. An adjustable reactive power compensator for a transmission line comprising, a power-drawing reactive element; a variable shunt reactance having magnetically coupled exciting and power windings, the exciting winding having a relatively large inductive power loss when the power winding is unloaded; means for connecting the exciting winding of the shunt reactance across the transmission line at a prescribed junction thereof; means for coupling the power winding of the shunt reactance to the reactive element for energizing such element so that the element draws power from the shunt reactance and changes the impedance of said reactance in response to the power drawn; detection means for sensing the instantaneous voltage across the junction; and control means coupled to the detection means for generating a control signal indicative of the difference between the sensed voltage from the detection means and a reference value; the control means being coupled with the reactive element and with the shunt reactance for adjusting the power drawn by the reactive element to vary the impedance of the reactance and maintain the voltage at the junction at the reference value.

3. A compensator as defined in claim 2, in which discretely variable capacitor means are connected in parallel with the exciting winding of the shunt reactance.

4. A compensator as defined in claim 3, further comprising means for coupling the control means to the capacitor means for selectively varying the capacitance of the capacitance means.

5. A reactive power compensator for a transmission line, comprising a shunt reactor having a first winding connected across the line for varying the electrical conditions across the line, control means responsive to the conditions across the line for varying the reactance of said shunt reactor, characterized in that said control means includes a second winding inductively coupled to said first winding a power drawing element coupled to the second winding, and a control circuit responsive to the electrical conditions of the line and coupled to the power drawing element for varying the impedance of the element so as to draw power from the second winding through the element and thereby change the reactance of the shunt reactor.

6. An apparatus as in claim 5, wherein said element has a variable impedance response to the control circuit.

7. An apparatus as in claim 5, wherein said element is a reactive element.

8. An apparatus as in claim 7, wherein said reactive element is a choke controlled by a DC bias.

9. An apparatus as in claim 7, wherein said element is a synchronous phase shifter.

10. An apparatus as in claim 7, wherein said element is a thyristor controlled capacitor.

11. An apparatus as in claim 7, wherein said element is a choke bank.

* * * * *